(12) United States Patent
Blase

(10) Patent No.: US 6,550,233 B2
(45) Date of Patent: Apr. 22, 2003

(54) ENERGY GUIDING CHAIN

(75) Inventor: Günter Blase, Bergisch Gladbach (DE)

(73) Assignee: Igus Spritzgussteile für die Industrie GmbH, Köln (DE)

( * ) Notice: Subject to any disclaimer, the term of this patent is extended or adjusted under 35 U.S.C. 154(b) by 0 days.

(21) Appl. No.: 09/982,441

(22) Filed: Oct. 18, 2001

(65) Prior Publication Data

US 2002/0056336 A1 May 16, 2002

Related U.S. Application Data

(63) Continuation of application No. PCT/DE00/00908, filed on Mar. 24, 2000.

(30) Foreign Application Priority Data

Apr. 19, 1999 (DE) .......................................... 199 19 076

(51) Int. Cl.[7] ............................................... F16G 13/00
(52) U.S. Cl. ........................................... 59/78.1; 248/49
(58) Field of Search ........................... 59/78.1; 248/49, 248/51

(56) References Cited

U.S. PATENT DOCUMENTS

| | | | | |
|---|---|---|---|---|
| 4,570,437 A | * | 2/1986 | Moritz ........................ | 59/78.1 |
| 4,590,961 A | * | 5/1986 | Schumann .................. | 59/78.1 |
| 5,108,350 A | | 4/1992 | Szpakowski | |
| 5,881,548 A | | 3/1999 | Takahashi et al. | |
| 5,996,330 A | * | 12/1999 | Ehmann et al. ............ | 248/49 |
| 6,016,844 A | * | 1/2000 | Takahashi et al. .......... | 59/78.1 |
| 6,067,788 A | * | 5/2000 | Weber ......................... | 248/49 |
| 6,161,373 A | * | 12/2000 | Heidrich et al. ............. | 248/49 |
| 6,176,072 B1 | * | 1/2001 | Weber ......................... | 59/78.1 |
| 6,318,063 B1 | * | 11/2001 | Komiya et al. .............. | 248/49 |
| 6,349,534 B1 | * | 2/2002 | Zanolla et al. .............. | 59/78.1 |

FOREIGN PATENT DOCUMENTS

| | | |
|---|---|---|
| DE | 37 14 056 | 8/1988 |
| DE | 43 13 075 | 11/1994 |
| EP | 0 844 415 | 5/1998 |

* cited by examiner

Primary Examiner—David Jones
(74) Attorney, Agent, or Firm—Akin Gump Strauss Hauer & Feld, L.L.P.

(57) ABSTRACT

Energy guiding chains serve to guide cables, hoses and the like from one connection point to another, at least one of the two connection points being movable, the energy guiding chain having a plurality of plastic chain links that are, or can be connected to one another in articulated fashion, each of which includes two side straps and two cross-members, where at least one of the cross-members is connected to the side straps in detachable fashion and a snap mechanism is provided, which interacts with a snap ridge provided on each end of the cross-member. In order to also make it possible for the snap mechanism to be easily released by hand, it is designed as an elastic hook, which is located in the center of the cross-member when the respective cross-member is mounted and protrudes beyond the outside surface of the cross-member, so that is accessible by hand. In the area in front of the hook, the outside surface of the cross-member has a grip extending from the snap ridge towards the center of the chain link.

10 Claims, 5 Drawing Sheets

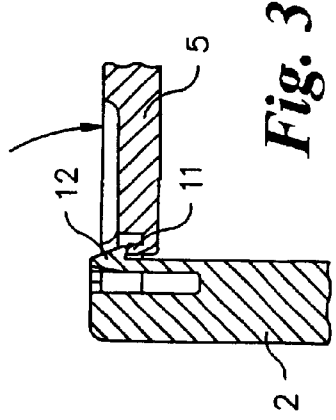
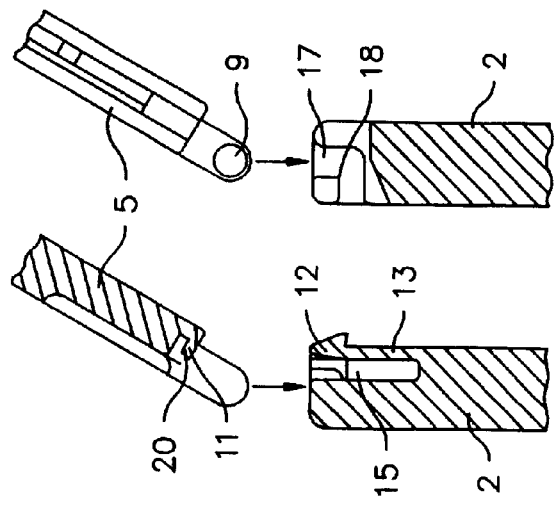
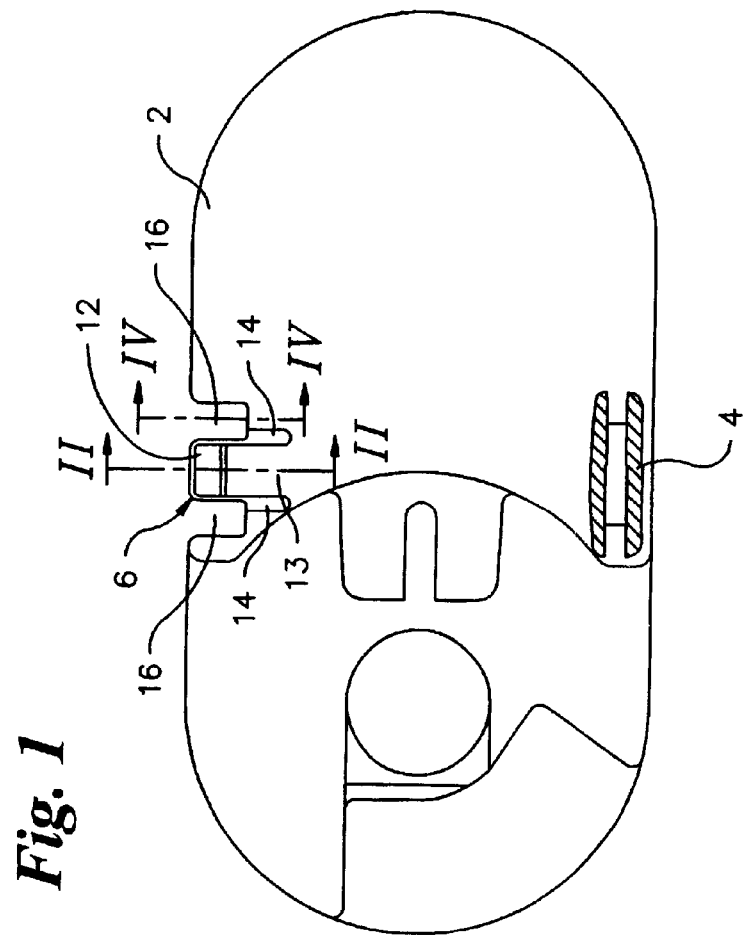

ENERGY GUIDING CHAIN

CROSS-REFERENCE TO RELATED APPLICATION

This application is a continuation of International Application No. PCT/DE00/00908, filed Mar. 24, 2000, the disclosure of which is incorporated herein by reference.

BACKGROUND OF THE INVENTION

The invention relates to an energy guiding chain for guiding cables, hoses and the like from one connection point to another, where at least one of the two connection points is movable, consisting of numerous plastic chain links that are, or can be connected to one another in articulated fashion, each of which comprises two side straps and two cross-members, where at least one of the cross-members is, or can be connected to the side straps in detachable fashion, the cross-member having projections arranged parallel to one another on both sides and extending in the longitudinal direction of the cross-member, these projections being provided with transverse, cylindrical bearing pins, the side straps having two parallel slits, which are engaged by the projections of the cross-member, the side straps having groove-shaped bearing areas with undercuts, into which the bearing pins can be snapped, and the side straps having a snap mechanism, which interacts with a snap ridge provided on each end of the cross-member.

Known energy guiding chains of the type described (DE 43 13 075 C2) have proven to be very effective. In these known energy guiding chains, the connection between the side straps and the cross-members must be established using a tool similar to a screwdriver.

BRIEF SUMMARY OF THE INVENTION

The object of the invention is to modify the energy guiding chain in such a way that the cross-members can also be easily opened by hand.

According to the invention, this object is solved in that the snap mechanism is designed as an elastic hook, which is located in the center between the projections when the respective cross-member is mounted, reaches through the space between the two projections and is accessible by hand from the outside.

The design according to the invention makes it very easy to open the energy guiding chain by hand, in that the operator grasps the cross-member to be swung up with his hand and releases the hook with his thumb, so that the cross-member can be swung up on the respective side.

In order to make handling even easier, the hook can protrude beyond the outside surface of the cross-member when the cross-member is mounted, so that the hook is easy to actuate with the thumb.

The hook is preferably located on the end of an elastic tab. As a result of this design, it is possible to make the hook very easy to actuate, so that the operator need not apply any great force in order to open the connection.

The hook is expediently designed to be as wide as the inside space between the two projections provided on the cross-member. In this way, the hook can be designed to be relatively wide and thus fairly stable, despite its great flexibility.

The snap ridge is expediently provided with a snap surface, which faces the outside surface of the cross-member and is engaged from above by the hook when it is snapped in place.

In order to be released, the hook need only be pushed down off the snap surface, this requiring only a short displacement path.

Furthermore, the snap ridge can have a lateral, bevelled surface facing the hook, which deflects the hook when the cross-member is pushed down, until it snaps over the snap surface of the snap ridge. As with other known designs, this design makes it easy to engage the hook by pressing down on the respective cross-member.

The material of the cross-member can have an undercut on the side directly opposite the snap ridge. This makes it possible to also deflect the hook with the help of a screwdriver-like tool if necessary in order to release the connection. The option of using a tool is employed if very many members need to be detached and/or if the operator has a hand injury.

The outside surface of the cross-member preferably has a grip extending from the snap ridge towards the centre of the chain link, in which the thumb is positioned and then pressed against the hook in order to open the cross-member. As a result of this design, the hook can be relatively short, without thereby impairing its user-friendliness.

The grip can be wider than the inside space between the two projections, so that there is enough room to position the respective thumb.

The bearing pins are expediently located on the outer sides of the projections. As a result of this design, the projections provided with the bearing pins can be wider, thus making the overall design more stable.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

FIG. 1 is an inside view of a side strap of a chain link,

FIG. 2 is a cross-section along Line II—II of the side strap in FIG. 1, where the end of a cross-member is to be inserted, FIG. 3 is the same cross-section as in FIG. 2 with a mounted cross-member, FIG. 4 is a cross-section along line IV—IV in FIG. 1, where the cross-member is to be inserted from above.

DETAILED DESCRIPTION OF THE INVENTION

Energy guiding chains are assembled from numerous chain links 1 connected to one another in articulated fashion.

Figure 5:
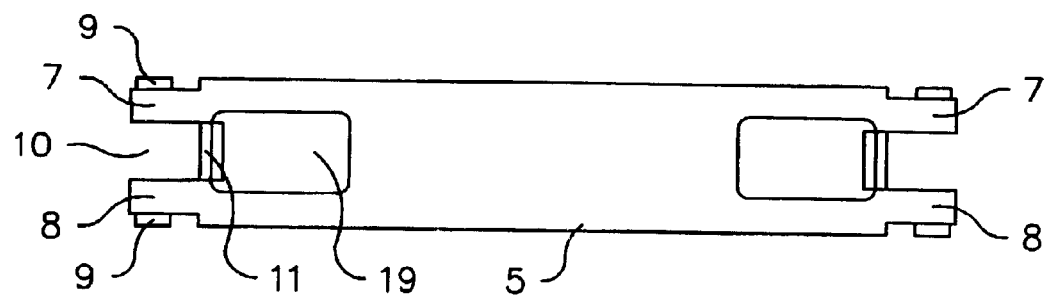
FIG. 5 is the top view of a cross-member.
Figure 6:
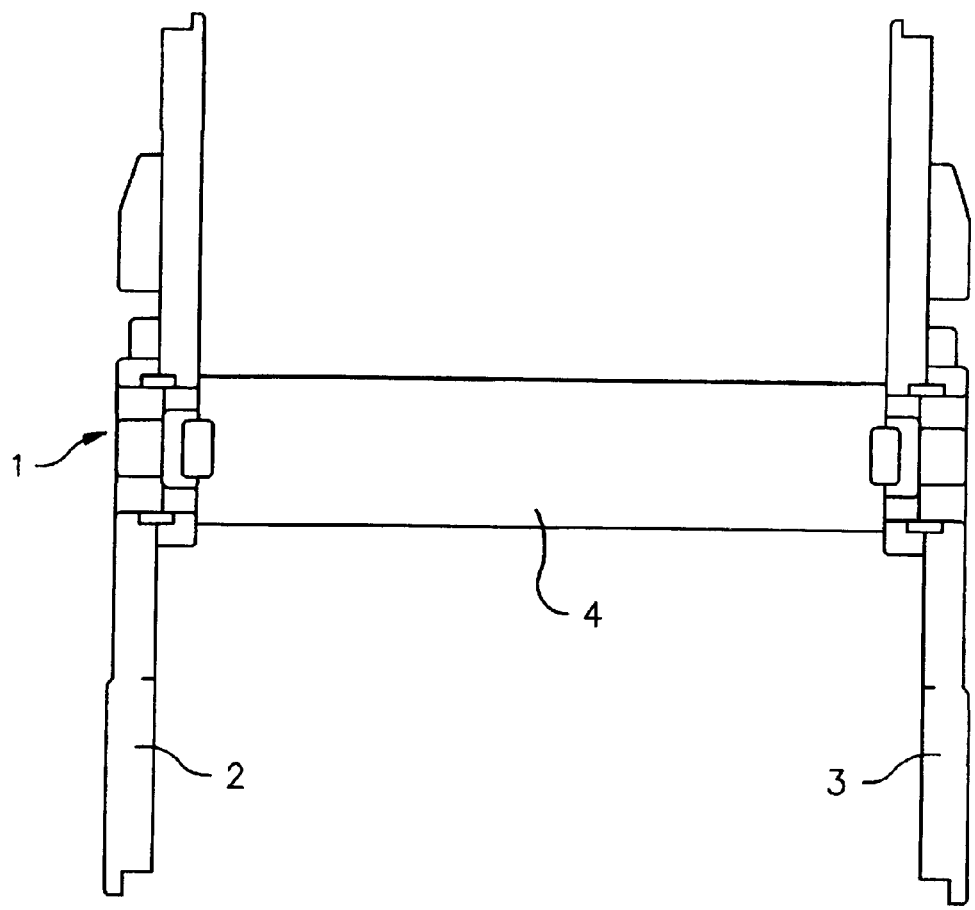
FIG. 6 is the top view of a chain link without the top cross-member according to FIG. 5, FIGS. 7 to 10 are detailed views of the mechanism involved in snapping on a cross-member.

According to FIGS. 1, 5 and 6, a single chain link 1 consists of two side straps 2 and 3 connected to one another by two cross-members 4 and 5. Bottom cross-member 4, a cross-section of which is shown in FIG. 1, is manufactured together with the two side straps 2 and 3 as a single, injection-moulded part from a plastic that displays a certain degree of elasticity. The top cross-member 5 is designed as a separate part and can be mounted on the two side straps 2 and 3 by a snap mechanism 6. In this context, it would also be conceivable for bottom cross-member 4 to be connected to the two side straps 2 and 3 by a correspondingly designed snap mechanism.

Separately designed upper cross-member 5, which is to be connected to the two side straps 2 and 3 by means of snap mechanism 6, in order to be able to open and close the energy guiding chain, comprises a long part provided on both ends with projections 7 and 8, which are parallel to one another and extend in the longitudinal direction of cross-member 5. Projections 7 and 8 are equipped with transverse, cylindrical bearing pins 9 located on the outer sides of projections 7 and 8.

A snap ridge 11, which interacts with snap mechanism 6, is located at the bottom of space 10 between the two projections 7 and 8.

As can be seen particularly clearly in FIGS. 1, 2 and 3, snap mechanism 6 consists of an elastic hook 12, the width of which fits exactly into space 10 between the two projections 7 and 8 and which interacts with snap ridge 11. The elasticity of hook 12 is achieved in that it is located on the end of an elastic tab 13. Elastic tab 13 is separated from the remaining material by lateral slits 14 and a rear space 15, so that hook 12 in the cross-section shown in FIG. 2 can be moved to the right and left.

Two recesses 16 are located in the areas on both sides of hook 12, which serve to receive projections 7 and 8 of cross-member 5 in assembled condition. In this context, bearing pins 9 engage lateral guide grooves 17 by snapping behind undercut 18 in the final position.

The top of cross-member 5 is provided on each end with a grip 19 directly next to snap ridge 11, grip 19 being somewhat wider than the inside space 10 between the two projections 7 and 8.

Figure 7:
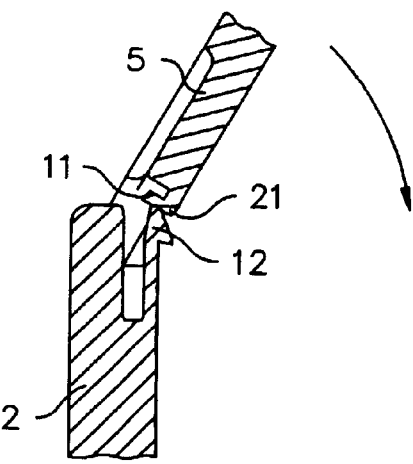
Figure 8:
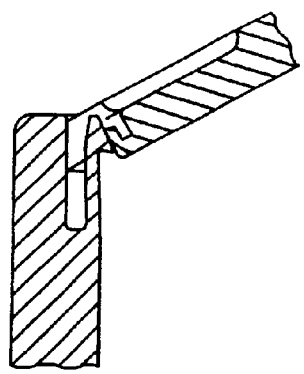
Figure 9:
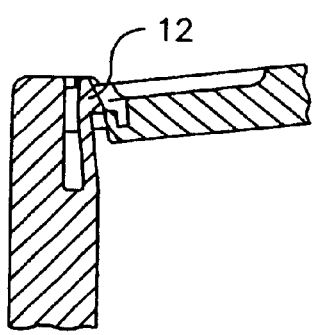
Figure 10:
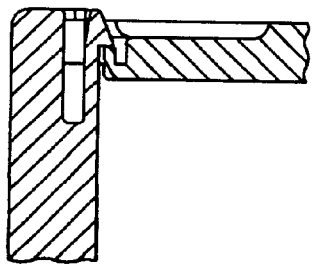

As shown in FIGS. 2 to 4, one side of upper cross-member 5 is first inserted from above at a steep angle into its receiving area, where projections 7 and 8 engage recesses 16 and the two bearing pins 9 are inserted into guide grooves 17 until they snap behind undercuts 18. As shown in FIG. 3, cross-member 5 is then swung into the horizontal closing position, in which hook 12 snaps over snap surface 20 of snap ridge 11 facing the outside surface of the cross-member. The snapping process is shown in detail in FIGS. 7 to 10. Once bearing pins 9 of cross-member 5 have been inserted into guide grooves 17 in the initially open condition, cross-member 5 is then swung down in the direction of the arrow in FIG. 7. During this movement, a bevelled surface 21 provided on snap ridge 11 slides along hook 12, as can be seen particularly clearly in FIG. 8, until the position shown in FIG. 9 is reached. After reaching this position, hook 12 snaps over snap ridge 11 and is then in contact with snap surface 20 of snap ridge 11 and fixed in this position. On the opposite side, not shown in the drawing, cross-member 5 snaps into its locked position in the same manner where, however, bearing pins 9 and hook 12 engage simultaneously when cross-member 5 is in nearly horizontal position.

Figure 11:
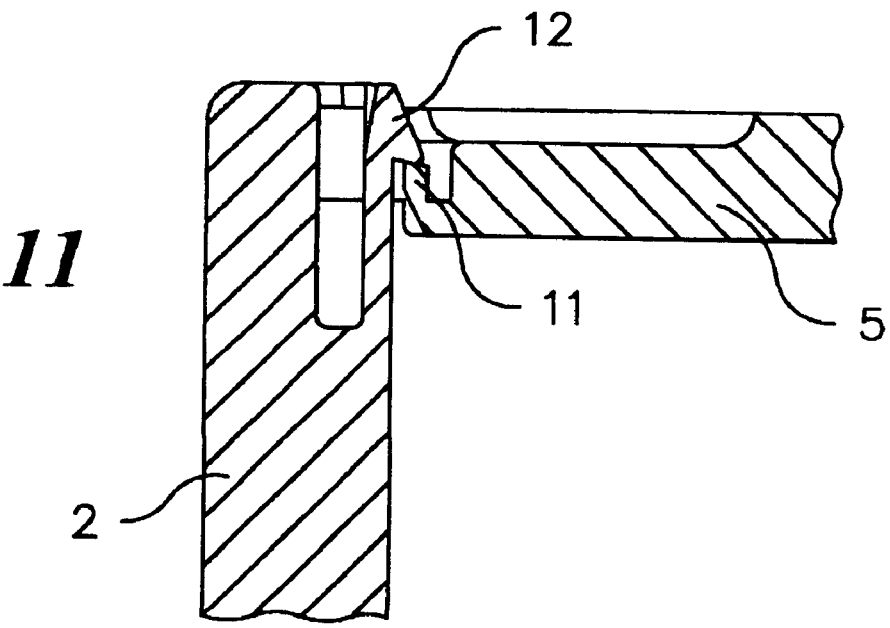
FIGS. 11 and 12 show the mechanism involved in detaching a cross member.
Figure 12:
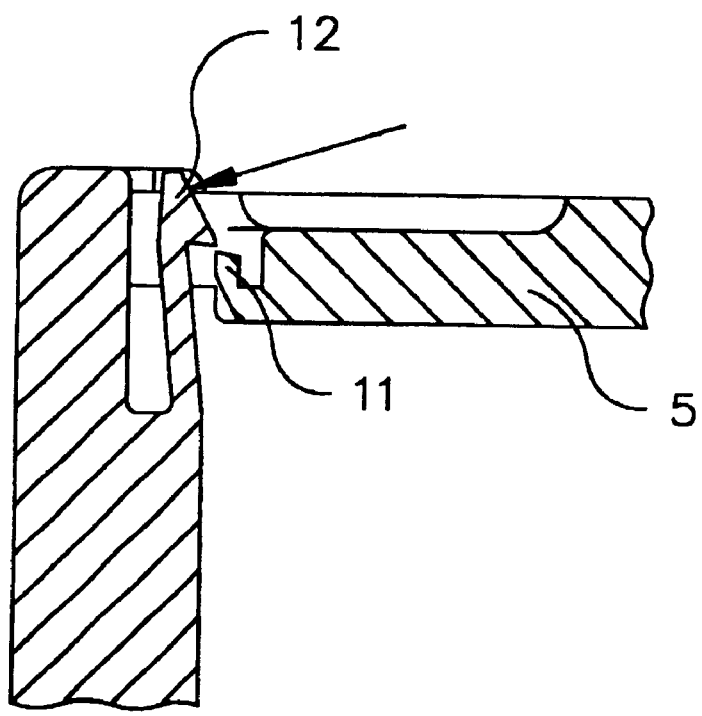

If cross-member 5 is to be opened, hook 12 must be deflected from the position shown in FIG. 11 into the position shown in FIG. 12 by applying pressure in the direction of the arrow. In this position, snap ridge 11 is no longer engaged by hook 12, meaning that cross-member 5 can be lifted up at this point, thus releasing bearing pins 9 from guide grooves 17. The pressure in the direction of the arrow shown in FIG. 12 can be applied, for example, by the thumb of the operator, while the other fingers are used to grasp cross-member 5.

Figure 13:
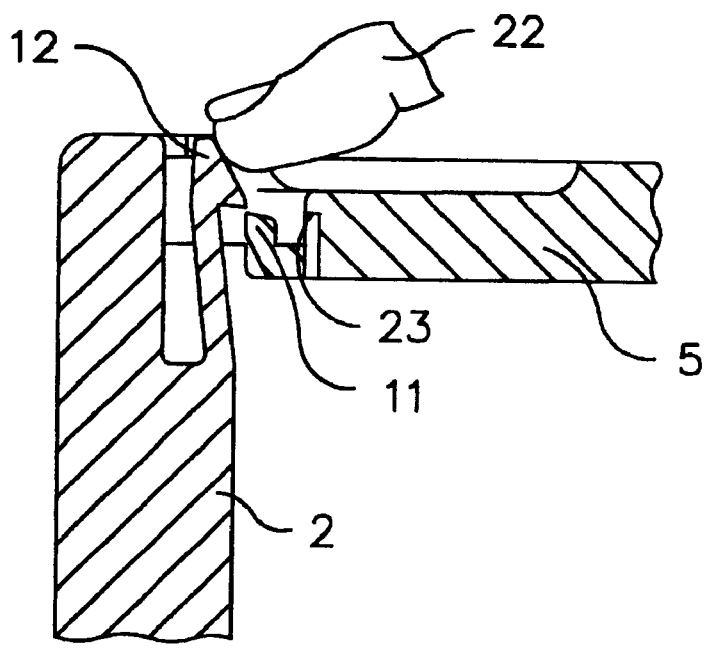
FIG. 13 is another embodiment of the invention, in which the snap mechanism for detaching the cross-member is actuated by the thumb or another suitable finger.
Figure 14:
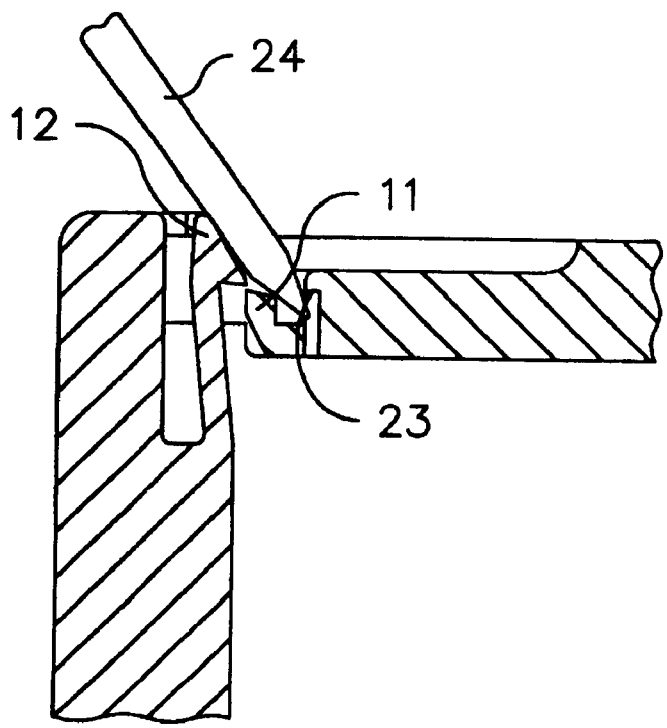
FIG. 14 is the same configuration as in FIG. 14 where, however, the snap mechanism is released with a tool.

The application of pressure to hook 12 using a finger 22 is shown in FIG. 13, which illustrates a modified configuration of the invention. In this configuration, an undercut 23 is provided in the material of cross-member 5 on the side directly opposite snap ridge 11. In this configuration, the pressure can also be applied to hook 12 using a tool 24 (as shown in FIG. 14), which is similar in shape to a screwdriver, for example. In this context, the tip of the screwdriver is inserted behind undercut 23 and tool 24 in FIG. 14 is swung to the left, thus pushing hook 12 into a release position, in which snap ridge 11 is free and cross-member 5 can be moved up on this side.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An energy guiding chain for guiding cables and hoses from one connection point to another, where at least one of the two connection points is movable, the energy guide chain comprising a plurality of plastic chain links (1) connectable to one another in articulated fashion, each link comprising two side straps (2, 3) and two cross-members (4, 5), wherein
    at least one of the cross-members (5) is detachably connectable to the side straps (2, 3),
    the at least one of the cross members (5) having projections (7–8) arranged parallel to one another on both sides and extending in a longitudinal direction of the at least one of the cross members (5), the projections (7, 8) being provided with transverse, cylindrical bearing pins (9),
    an inside space formed between the projections (7, 8),
    a snap ridge (11) provided between the projections (7, 8),
    the side straps (2, 3) having two parallel slits (14), which are engaged by the projections (7, 8) of the cross-member (5),
    the side straps (2, 3) having groove-shaped bearing areas with undercuts (18), into which the bearing pins (9) can be snapped,
    the side straps (2, 3) having a snap mechanism (6) designed as an elastic hook (12),
    wherein the elastic hook (12) is centrally located between the projections (7,8), extends through the inside space (10) between the projections (7, 8), interacts with the snap ridge (11) and is accessible by hand to disengage the elastic hook (12) from the snap ridge (11) when the at least one of the cross members (5) is mounted.

2. The energy guiding chain as per claim 1, wherein the hook (12) protrudes beyond an outwardly facing surface of the at least one of the cross members (5) proximal to the projections (7, 8) when the at least one of the cross members (5) is mounted.

3. The energy guiding chain as per claim 1, wherein the hook (12) has an elastic tab (13).

4. The energy guiding chain as per claim 1, wherein the hook (12) has a width substantially equal to a width of the inside space (10) between the two projections (7, 8).

5. Energy guiding chain as per claim 1, wherein the snap ridge (11) has an outwardly facing snap surface (20) releasable engaged by the hook (12) when the at least one of the cross members (5) is mounted.

6. The energy guiding chain as per claim 1, wherein the snap ridge (11) has a lateral, beveled surface (21) engaged with and deflecting the hook (12), during mounting of the at least one of the cross members (5).

7. The energy guiding chain as per claim 1, wherein the cross-member (5) has an undercut (23) on a side directly opposite the snap ridge (11).

8. The energy guiding chain as per claim 1, wherein an outside surface of the cross-member (5) has a recessed portion (19) extending from the snap ridge (11) towards a center of the chain link.

9. The energy guiding chain as per claim 8, wherein the recessed portion has a width greater than a width of the inside space (10) between the two projections (7, 8).

10. The energy guiding chain as per claim 1, wherein the bearing pins (9) are located on outer sides of the projections (7, 8) opposed to the undercuts (18) when the at least one of the cross members (5) is mounted.

\* \* \* \* \*